(12) United States Patent
Mittmann et al.

(10) Patent No.: US 11,897,057 B2
(45) Date of Patent: *Feb. 13, 2024

(54) INTELLIGENT SOLDERING TIP (71) Applicant: APEX BRANDS, INC., Apex, NC (US)

(72) Inventors: Gert Mittmann, Mockmuhl (DE); Bernhard Eigen, Murr (DE); Michael Mohl, Freudental (DE); Ralf Zerweck, Bonnigheim (DE); Dirk Schonau, Nordheim (DE)

(73) Assignee: APEX BRANDS, INC., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,740

(22) Filed: Jun. 3, 2022

(65) Prior Publication Data

US 2022/0288711 A1 Sep. 15, 2022

Related U.S. Application Data (63) Continuation of application No. 17/044,851, filed as application No. PCT/US2019/025335 on Apr. 2, 2019, now Pat. No. 11,376,683.

(Continued)

(51) Int. Cl.
*B23K 3/00* (2006.01)
*B23K 3/03* (2006.01)
(Continued)

(52) U.S. Cl.
CPC .............. *B23K 3/033* (2013.01); *B23K 3/026* (2013.01); *B23K 3/087* (2013.01)

(58) Field of Classification Search
CPC ........ B23K 3/033; B23K 3/026; B23K 35/00; B23K 3/00–087
(Continued)

(56) References Cited

U.S. PATENT DOCUMENTS 2,897,335 A * 7/1959 Finch ..................... B23K 3/033
219/241
2,982,838 A * 5/1961 Tyler ..................... H01H 37/48
219/241
(Continued)

FOREIGN PATENT DOCUMENTS

CN 102188824 9/2011
CN 105014178 A * 11/2015 ............. B23K 3/033
(Continued)

OTHER PUBLICATIONS

Office Action (with translation) issued in corresponding Chinese Application No. 202210660640.X on Apr. 15, 2023.
(Continued)

*Primary Examiner* — Kiley S Stoner
(74) *Attorney, Agent, or Firm* — BURR & FORMAN LLP (57) ABSTRACT

A soldering tool may include a tool body comprising circuitry configured to interface with a controller, and a tip portion including a tip that is heated to melt solder and a handpiece that is graspable by an operator. The tip portion includes a heater and a sensor disposed in the tip. The tip portion includes a tip memory device disposed at the handpiece. The tip memory device is configured to store parametric data. The tip memory device is configured to exchange data with the controller.

13 Claims, 4 Drawing Sheets

Related U.S. Application Data (60) Provisional application No. 62/651,344, filed on Apr. 2, 2018.

(51) Int. Cl.
*B23K 3/02* (2006.01)
*B23K 3/08* (2006.01)

(58) Field of Classification Search
USPC .......................... 228/102–103, 8–9, 51–55
See application file for complete search history.

(56) References Cited

U.S. PATENT DOCUMENTS

| | | | | |
|---|---|---|---|---|
| 3,646,577 | A * | 2/1972 | Ernst | G05D 23/1909 |
| | | | | 219/505 |
| 3,699,306 | A * | 10/1972 | Finch | B23K 3/0338 |
| | | | | 228/55 |
| 3,716,692 | A * | 2/1973 | Schick | G05D 23/1909 |
| | | | | 219/505 |
| 4,822,979 | A * | 4/1989 | deKam | B23K 3/033 |
| | | | | 219/229 |
| 4,861,967 | A | 8/1989 | Yoshimura | |
| 4,891,497 | A | 1/1990 | Yoshimura | |
| 4,945,210 | A | 7/1990 | Yoshimura | |
| 4,960,975 | A | 10/1990 | Weinbrecht | |
| 5,094,384 | A * | 3/1992 | Urban | B23K 3/0338 |
| | | | | 76/1 |
| 5,122,637 | A * | 6/1992 | Bottorff | B23K 3/033 |
| | | | | 219/229 |
| 5,151,574 | A * | 9/1992 | Urban | B23K 3/047 |
| | | | | 374/185 |
| 5,412,178 | A * | 5/1995 | Tamura | B23K 3/033 |
| | | | | 219/241 |
| 5,422,457 | A * | 6/1995 | Tang | B23K 3/0315 |
| | | | | 219/238 |
| 5,837,973 | A | 11/1998 | Tamura | |
| 6,111,222 | A | 8/2000 | Hattori | |
| 6,215,104 | B1 * | 4/2001 | Kurpiela | B23K 3/0369 |
| | | | | 219/230 |
| 6,329,641 | B1 | 12/2001 | Miyazaki et al. | |
| 6,369,359 | B1 * | 4/2002 | Morrison | B23K 3/0615 |
| | | | | 219/241 |
| 6,580,050 | B1 | 6/2003 | Miller et al. | |
| 2003/0015512 | A1 * | 1/2003 | Sakamoto | B23K 3/0478 |
| | | | | 219/535 |
| 2004/0232132 | A1 | 11/2004 | Masaki | |
| 2005/0011876 | A1 * | 1/2005 | Uetani | B23K 3/0369 |
| | | | | 219/229 |
| 2006/0022018 | A1 * | 2/2006 | Yoshimura | B23K 3/0361 |
| | | | | 228/55 |
| 2006/0108345 | A1 * | 5/2006 | Shigekawa | B23K 3/0369 |
| | | | | 219/229 |
| 2006/0157467 | A1 * | 7/2006 | Shigekawa | B23K 3/0361 |
| | | | | 219/229 |
| 2007/0272725 | A1 * | 11/2007 | Zerweck | B23K 3/0315 |
| | | | | 228/55 |
| 2008/0272105 | A1 * | 11/2008 | Weissenberger | B23K 3/0338 |
| | | | | 219/209 |
| 2010/0017555 | A1 | 1/2010 | Chang et al. | |
| 2010/0108647 | A1 * | 5/2010 | Teraoka | B23K 3/03 |
| | | | | 219/85.1 |
| 2010/0187205 | A1 * | 7/2010 | Masaki | B23K 3/033 |
| | | | | 29/611 |
| 2011/0073583 | A1 | 3/2011 | Liu | |
| 2015/0380884 | A1 | 12/2015 | Lee et al. | |
| 2016/0096232 | A1 | 4/2016 | Marino et al. | |
| 2017/0173719 | A1 | 6/2017 | Nguyen et al. | |
| 2017/0182577 | A1 | 6/2017 | Kataoka et al. | |
| 2017/0368627 | A1 | 12/2017 | Shigekawa et al. | |
| 2019/0134730 | A1 * | 5/2019 | Teraoka | B23K 3/0323 |
| 2019/0217410 | A1 | 7/2019 | Nguyen | |
| 2019/0262925 | A1 | 8/2019 | Ebisawa | |
| 2019/0299311 | A1 * | 10/2019 | Mochizuki | B23K 3/033 |
| 2019/0364668 | A1 * | 11/2019 | Nguyen | B23K 3/026 |
| 2020/0030902 | A1 * | 1/2020 | Matsuzaki | B23K 3/033 |
| 2020/0130085 | A1 * | 4/2020 | Miyazaki | B23K 3/033 |
| 2022/0226918 | A1 * | 7/2022 | Nguyen | B23K 3/027 |
| 2022/0226919 | A1 * | 7/2022 | Nguyen | B23K 3/0478 |

FOREIGN PATENT DOCUMENTS

| | | | | |
|---|---|---|---|---|
| CN | 105195848 | A * | 12/2015 | ............ B23K 3/03 |
| CN | 106334853 | | 1/2017 | |
| CN | 205944533 | | 2/2017 | |
| CN | 206026315 | U | 3/2017 | |
| CN | 109175583 | A * | 1/2019 | ........... B23K 3/0338 |
| CN | 109365946 | A * | 2/2019 | ........... B23K 3/033 |
| CN | 109396594 | A * | 3/2019 | ........... B23K 3/0338 |
| CN | 210024030 | U * | 2/2020 | ............ B23K 3/03 |
| DE | 102013013826 | A1 * | 2/2015 | ........... B23K 1/0008 |
| EP | 1086772 | A2 * | 3/2001 | ........... B23K 3/0315 |
| JP | 08219899 | A * | 8/1996 | ............ B23K 3/033 |
| JP | H1110328 | | 1/1999 | |
| KR | 20150022187 | A * | 3/2015 | |
| KR | 2020010940 | A * | 1/2020 | ............ B23K 3/026 |
| WO | WO-2016114263 | A1 * | 7/2016 | ............ B23K 3/02 |

OTHER PUBLICATIONS

Office Action from European Application No. 19782283.6 dated Dec. 1, 2021.
Weller, "Weller Das Original", (Dec. 31, 2016), pp. 1-3, 18-34, 355, XP55864194, Retrieved from www.weller-tools.com [retrieved on Nov. 22, 2021].
Office Action from related Chinese Application No. 201980034462.6 dated Aug. 25, 2021.
International Search Report and Written Opinion dated Jun. 24, 2019 in related International Application PCT/US2019/025335.
Second Office Action (with translation) issued in corresponding Chinese Application No. 202210660640.X dated Sep. 13, 2023, all enclosed pages cited.

* cited by examiner

INTELLIGENT SOLDERING TIP

CROSS-REFERENCE TO RELATED APPLICATIONS

The present application is a Continuation of U.S. application Ser. No. 17/044,851 filed Oct. 1, 2020, which is a National Stage Entry of PCT/US2019/025335 filed Apr. 2, 2019, which claims benefit of provisional application No. 62/651,344 filed Apr. 2, 2018, each of which is incorporated by reference herein in its entirety.

TECHNICAL FIELD

Example embodiments generally relate to soldering tools and, in particular, relate to such a tool having an intelligent soldering tip for improved monitoring.

BACKGROUND

Soldering tools, which are sometimes referred to as soldering irons or soldering guns, are commonly used in electronics manufacturing and repair activities along with other crafts and industries that involve metalwork. Soldering tools are typically used to join metallic items together at a joint by melting a filler metal (i.e., solder) into the joint. The solder has a lower melting point than the items being joined together at the joint, so the soldering tool needs to apply heat sufficient to melt the solder, but not hot enough to melt the items being joined.

Although a number of soldering tool designs have been proposed, a basic soldering tool design includes at least a tip portion that is operably coupled to a heater. The tip portion may, due to operation of the heater, become hot enough to melt the solder that contacts the tip portion. The tip portion may, in some cases, be removable/interchangeable so that a number of different geometries (e.g., sizes and/or shapes) of tips or bits can be substituted for respective different jobs. For example, some tip geometries (or shapes) may include a fine conical tip, a tapered chisel tip, a pyramid tip, a triangular flat face tip, a wide flat face tip, etc., where different sizes may further be available within each respective shape category.

For a typical soldering tool, it is not possible to detect or otherwise determine the geometry of the tip that has been selected. Thus, the soldering tool itself essentially treats all tips or bits the same. Accordingly, different tip temperatures may be experienced at the respective different tips, and soldering performance may vary. Additionally, values or parameters relating to lifetime performance of each tip cannot be determined.

As can be appreciated from the limitations described above, it may be desirable to improve soldering tool designs. For example, improvements in soldering tool design may enable better determination of tip temperatures and therefore also better performance and tracking of the lifetime operation of the tip.

BRIEF SUMMARY OF SOME EXAMPLES

Some example embodiments may enable the provision of an intelligent soldering tip that improves the overall functioning of typical soldering tools.

In an example embodiment, a soldering tool may be provided. The soldering tool may include a tool body comprising control circuitry configured to interface with a controller, and a tip portion including a tip that is heated to melt solder and a handpiece that is graspable by an operator. The tip portion includes a heater and a sensor disposed in the tip. The tip portion includes a tip memory device disposed at the handpiece. The tip memory device is configured to store parametric data gathered by the sensor. The tip memory device is configured to exchange data with the controller.

In another example embodiment, a tip portion for a soldering tool is provided. The soldering tool may include a tool body having control circuitry configured to interface with a controller. The tip portion may include a tip that is heated to melt solder based on operation of a heater, and a handpiece that is graspable by an operator. A sensor may be disposed in the tip proximate to the heater. The tip memory device may be disposed at the handpiece. The tip memory device may be configured to store parametric data gathered by the sensor and exchange data with the controller.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a soldering tool that includes an intelligent tip portion. A soldering tool employing the intelligent tip portion of example embodiments may include, for example, capabilities for determining the tip temperature of various different tip types or geometries. Accurate parametric data may therefore be recorded for the tip portion so that various life cycle determinations can be made for the tip portion.

Figure 1:
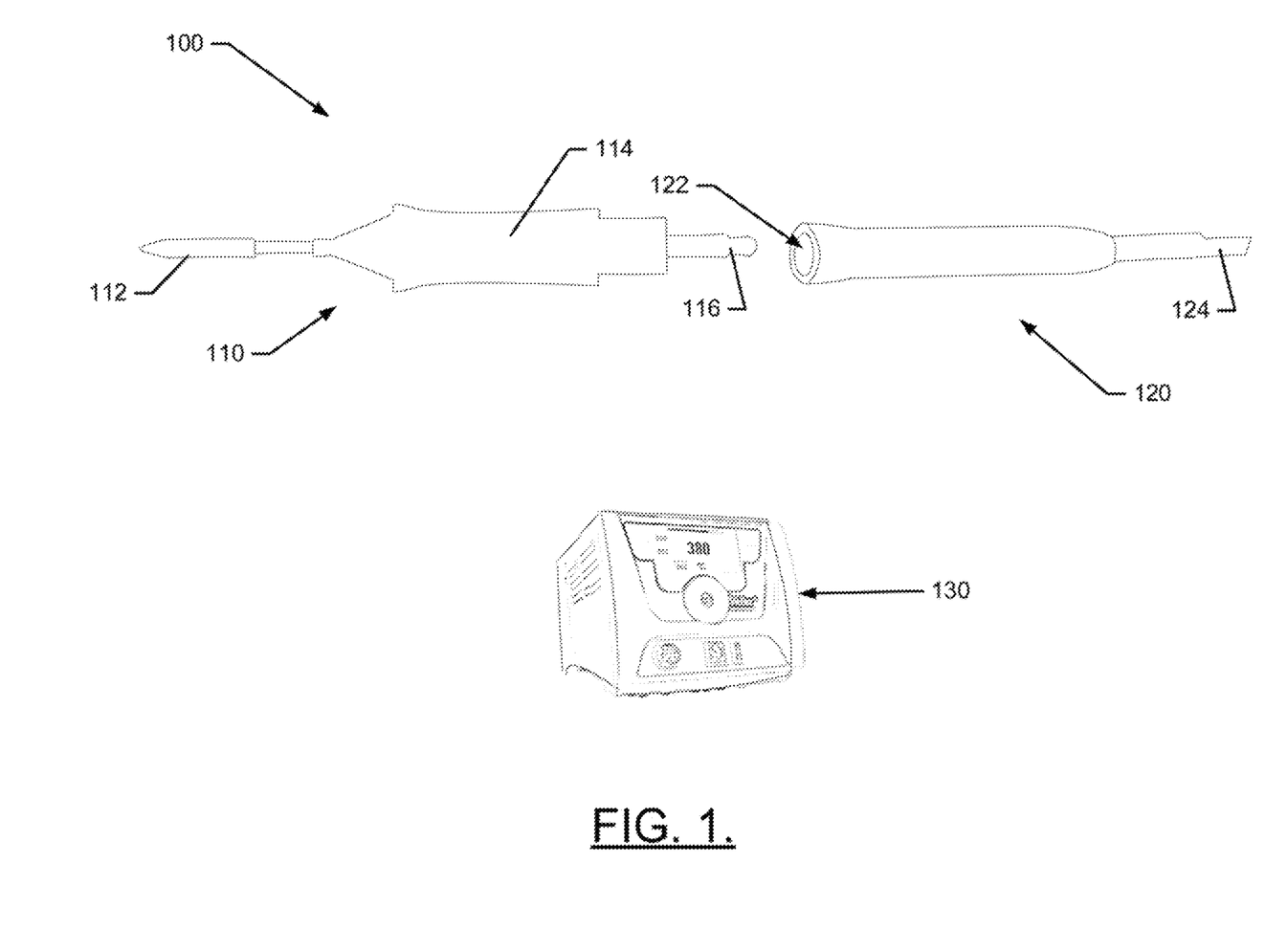
FIG. 1 illustrates a soldering tool structure that may be useful in connection with providing an intelligent soldering tip portion according to an example embodiment.

FIG. 1 illustrates a soldering tool 100 according to an example embodiment. As shown in FIG. 1, the soldering tool 100 of an example embodiment may include a tip portion 110 that integrates a tip 112 (or bit) together with a handpiece 114 in a single structure. The tip 112 may extend forward of the handpiece 114, generally in line with a longitudinal axis of the tip portion 110. The handpiece 114 may have insulated grips disposed thereon on an external surface thereof. Internally, the handpiece 114 may include electronic components for interfacing with or otherwise driving operation of the soldering tool 100 with respect to providing power for heat generation at the tip 112. The tip portion 110 may also include a plug pin 116 disposed on an opposite side of the handpiece 114 relative to the tip 112. The plug pin 116 may be coaxial with the tip 112 relative to the longitudinal axis of the tip portion 110. The plug pin 116 may include a first electrical connection 117 for power, a second electrical connection 119 for ground, and a third electrical connection 121 for communicating data.

In an example embodiment, the soldering tool 100 may also include a tool body 120 that is configured to mate with the tip portion 110. In particular, for example, the tool body 120 may include plug connector 122 configured to receive the plug pin 116 of the tip portion 110. Meanwhile, the tool body 120 may include electronics (e.g., control circuitry 230 discussed below in reference to FIG. 2) for directing operation of the components of the tip portion 110, and a power cord or cable 124 that operably couples the tool body 120 to a power unit 130. Thus, the power unit 130 may provide power and/or control signals to the tool body 120 via the cable 124. The plug connector 122 of the tool body 120 may include electrical interfaces that enable the power and/or control signals to be passed on to the tip portion 110 via the plug pin 116 when the plug pin 116 is inserted into and operably coupled to the plug connector 122.

Figure 2:
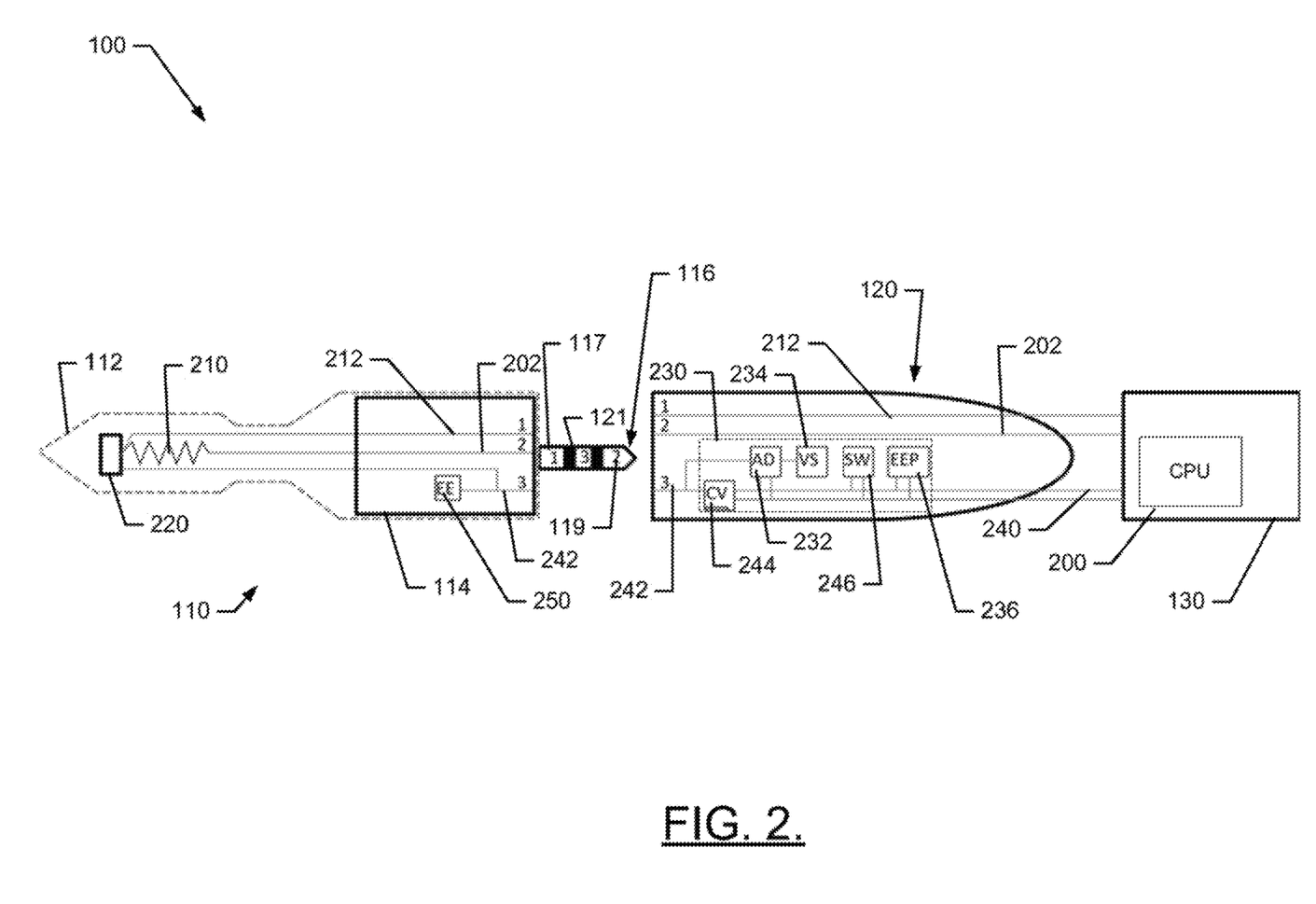
FIG. 2 illustrates a block diagram of the soldering tool according to an example embodiment.

FIG. 2 illustrates a block diagram of various components of the soldering tool 100 in accordance with an example embodiment. Referring now to FIG. 2, the power unit 130 may include processing circuitry in the form of a central processing unit (CPU) 200 or other controller. The CPU 200 may be configured to perform data processing, control function execution and/or other processing and management services for the power unit 130 specifically, and other portions of the soldering tool 100 generally, according to an example embodiment. In some embodiments, the CPU 200 may be embodied as a chip or chip set. In other words, the CPU 200 may comprise one or more physical packages (e.g., chips) including materials, components and/or wires on a structural assembly (e.g., a baseboard). In an example embodiment, the CPU 200 may include one or more instances of a processor and memory that may be in communication with or otherwise control a various components to which the CPU 200 is operably coupled (e.g., the tool body 120, the tip portion 110, and components thereof).

The power unit 130 may provide power to the tip portion 110 via the tool body 120. In this regard, for example, a power line 202 may extend from the power unit 130 and through the tool body 120. The power line 130 may be interruptible at the interface between the tip portion 110 and the tool body 120 (e.g., by removing the plug pin 116 from the plug connector 122). However, when the plug pin 116 is inserted into the plug connector 122, the power line 202 may be completed into the tip portion 110 and extend to heater 210. A ground wire 212 may similarly extend from the heater 210 to the power unit 130 via the tool body 120. The ground wire 212 may also be interruptible in similar fashion to the power line 202 as described above.

The heater 210 may be or include a resistive element that generates heat responsive to the running of current therethrough. The heater 210 may be disposed at or near the tip 112 of the tip portion 110 and may heat metal in the tip 112 as the temperature of the heater 210 rises. In an example embodiment, a sensor 220 may be disposed within the tip 112 as well. The sensor 220 may be disposed proximate to the heater 210 to sense a temperature of the heater 210, and portions of the tip 112 immediately adjacent to the sensor 220.

In an example embodiment, the CPU 200 may be operably coupled to control circuitry 230 disposed within the tool body 120. The control circuitry 230 may include an analog-to-digital (AD) converter 232, a vibration sensor 234, a memory device 236 (such as, for example, an EEPROM (electronically erasable programmable read-only memory)). The control circuitry 230 may be operably coupled to the CPU 200 via an I$^2$C 240, two wire communication connection. Meanwhile, only a single wire (i.e., connection wire 242) may operably couple the control circuitry 230 to the sensor 220. The connection wire 242 may, in some cases, provide continuous (or near continuous) feedback on temperature (or other parameters) sensed by the sensor 220. Accordingly, the control circuitry 230 may further include a converter 244 to convert from the I$^2$C 240 to the connection wire 242. In some cases, the control circuitry 230 may also include a switch 246 for powering lighting (e.g., light emitting diode (LED) ring lighting) on the soldering tool 100 to indicate when power is applied to the heater 210. As can be appreciated from FIG. 2, the cable 124 may house the power line 202, the ground wire 212 and the I$^2$C 240.

The connection wire 242 may also be interruptible in similar fashion to the power line 202 and the ground wire 212 as described above. Moreover, the plug pin 116 and the plug connector 122 may include electrical interfaces to operably couple the separate portions of the ground wire 212, the power wire 202 and the connection wire 242 to each other when the plug pin 116 is mated with the tool body 120 via the plug connector 122. Thus, for example, the control and parametric data communicated between the CPU 200 and the control circuitry 230 may be provided over the I$^2$C 240, whereas control and parametric data communicated between the control circuitry 230 and the sensor 220 may be provided over one wire in the form of the connection wire 242.

In an example embodiment, another memory device (e.g., tip memory 250) may be provided in the tip portion 110. In this regard, for example, the tip memory 250 may be operably coupled to both the control circuitry 230 and the sensor 220 via the connection wire 242. Thus, temperature feedback is provided via the connection wire 242 as well as the communication of any other parameters, identifying information, etc., that passes to and from the tip memory 250. As such, the tip memory 250 (which may be embodied as an EEPROM as well in some cases) may provide local storage for parameters (i.e., tip parameters) and/or identification information regarding the tip portion 110. The tip parameters may include data indicative of measurements taken by the sensor 220 (which may be registered temporally to identify the time associated with each measurement), or any other parametric data associated with operation of the soldering tool 100 (e.g., power on time, time above a threshold temperature, etc.). Thus, the tip parameters that can be stored locally at the tip portion 110 within the tip memory 250 may be very useful in determining a historical record of the operation of the tip portion 110. However, having the capability to store such information in direct association with the tip portion 110 itself also unlocks numerous other unique capabilities, as will be discussed in greater detail below.

As mentioned above, the tip 112 of many different instances of the tip portion 110 can be differently shaped and/or sized. Given this potential for variability, it should be appreciated that applying the same amount of heat (and therefore potentially the same sensed temperature) at the heater 210 may result in different temperatures at the distal end of the tip 112. Consider for example, the two tip portions shown in FIG. 3. In this regard, first tip portion 300 and second tip portion 310 may each have substantially identical constructions with the exception that the first tip portion 300 has a first tip 320 that is longer than a second tip 322 that is disposed on the second tip portion 310. Meanwhile, in each case, the heater 210 and the sensor 220 may be disposed in roughly the same location relative to the handpiece 114. However, a first tip extension portion 330 of the first tip portion 300 extends forward of the sensor 220 by a first distance (D1) that is longer than a second distance (D2) representing the amount of extension of a second tip extension portion 332 of the second tip portion 310. The difference between the first distance (D1) and the second distance (D2) may be understood to account for a temperature difference (T-Offset) at a distal end of the first tip 320 and the second tip 322 (i.e., where the temperature at the distal end of the first tip 320 is likely lower than the temperature at the distal end of the second tip 322 for the same temperature at the heater 210 (as recorded by the sensor 220)). Accordingly, for example, one or more temperature settings may be inserted into the heater 210 and the corresponding sensed temperature at the sensor 220 can be recorded for each of the first tip 320 and the second tip 322. Meanwhile, an accurate measurement of the temperature at the distal end of the tip (e.g., the first tip 320 and the second tip 322) can also be made. The T-Offset for each of the tips (e.g., the first tip 320 and the second tip 322) can then be determined and stored in the respective instances of the tip memory 250 in the first and second tip portions 300 and 310. The T-Offset can also be updated since the tip memory 250 can be alternately written to and read from an number of times. Thus, if a calibration is performed, old calibration data can be replaced with new calibration data. Moreover, in some cases, a historical record of sequential calibration operations and T-Offsets or other calibration data generated may be stored in the tip memory 250.

Figure 3:
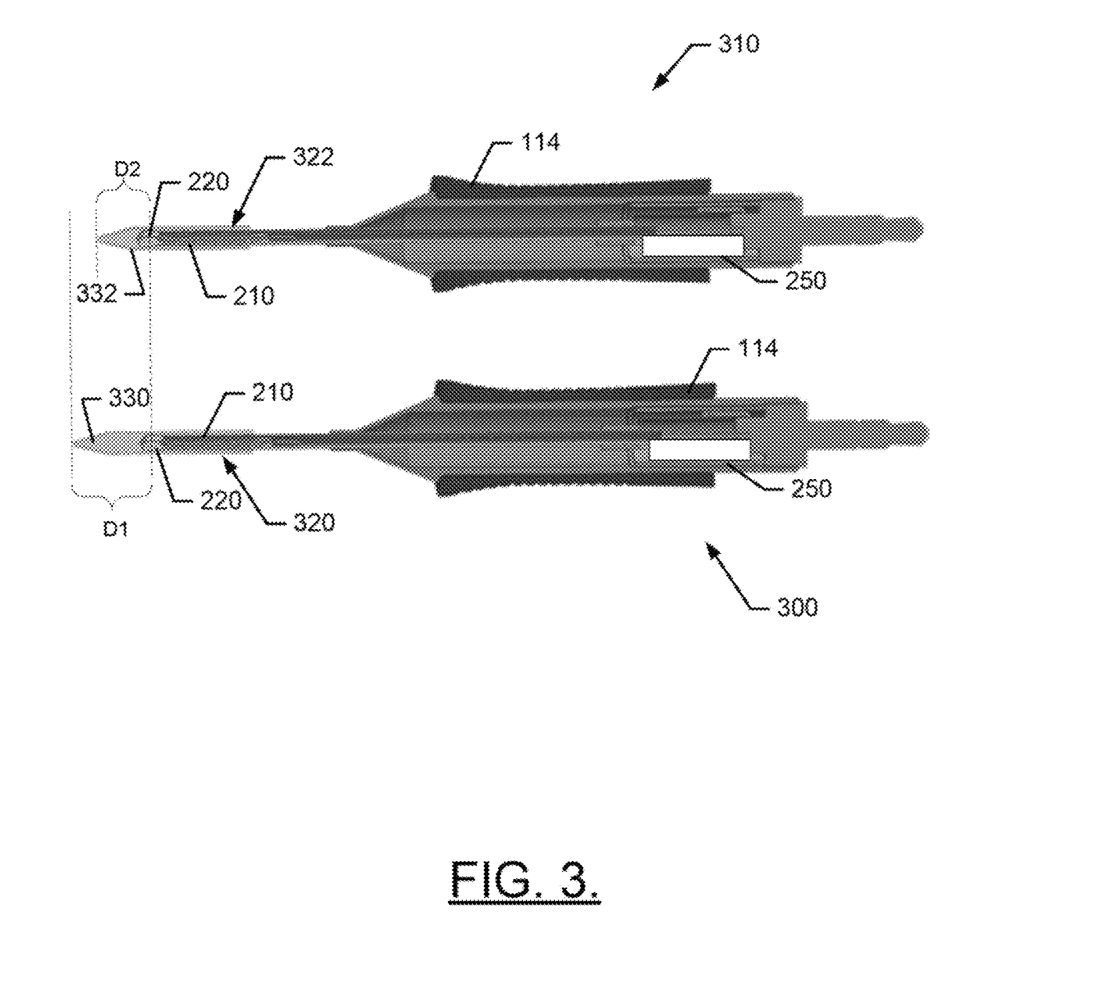
FIG. 3 illustrates two examples of tip portions having different tip lengths in accordance with an example embodiment.

By enabling the T-Offset for each tip portion to be stored in the tip memory 250 of the corresponding tip portion, each tip portion can be inserted interchangeably into any tool body, and with any power unit, and communicate its respective T-Offset to the tool body and/or power unit. The T-Offset can therefore act as calibration data to enable the tool body and/or power unit to provide specific targeted tip temperatures regardless of the tip portion that is being used. Thus, for example, if the operator has a power unit (e.g., power unit 130) that has one or more temperature settings that can be selected, the selection of a particular temperature setting by the operator can be used in connection with the calibration data provided by the particular tip portion that is currently attached to the tool body and power unit to set the heater 210 at a temperature that will result in (after considering T-Offset) the particular temperature setting at the distal end of the particular tip portion.

As can be appreciated from the description above, temperature calibration can occur based on specific knowledge of the characteristics of the tip portion 110, and such calibration data may be stored locally at the tip portion 110 in the tip memory 250 so that the tip memory 250 can share the calibration data (for temperature) with the tool body 120 and/or power unit 130. However, it should also be appreciated that any of multiple measurable parameters of the tip portion 110 could also or alternatively be calibrated for in similar fashion. For example, control parameters, life cycle data, or other measurable parameters related to operation of the soldering tool 100 can be measured at individual locations and at an instance of the sensor 220 that is configured to measure the corresponding parameter(s). The parameter(s) can then be compensated for (e.g., by defining respective parameter offsets) and the calibration data associated with such compensation may be stored locally at the tip portion 112. The calibration data may then be shared with the tool body 120 and/or power unit 130 for each and every individual instance of the tip portion 112 so that calibrated operation of the soldering tool 100 can be provided for any random tip portion that is inserted, so long as an instance of the tip memory 250 is able to communicate the corresponding calibration data to the tool body 120 and/or power unit 120.

Figure 4:
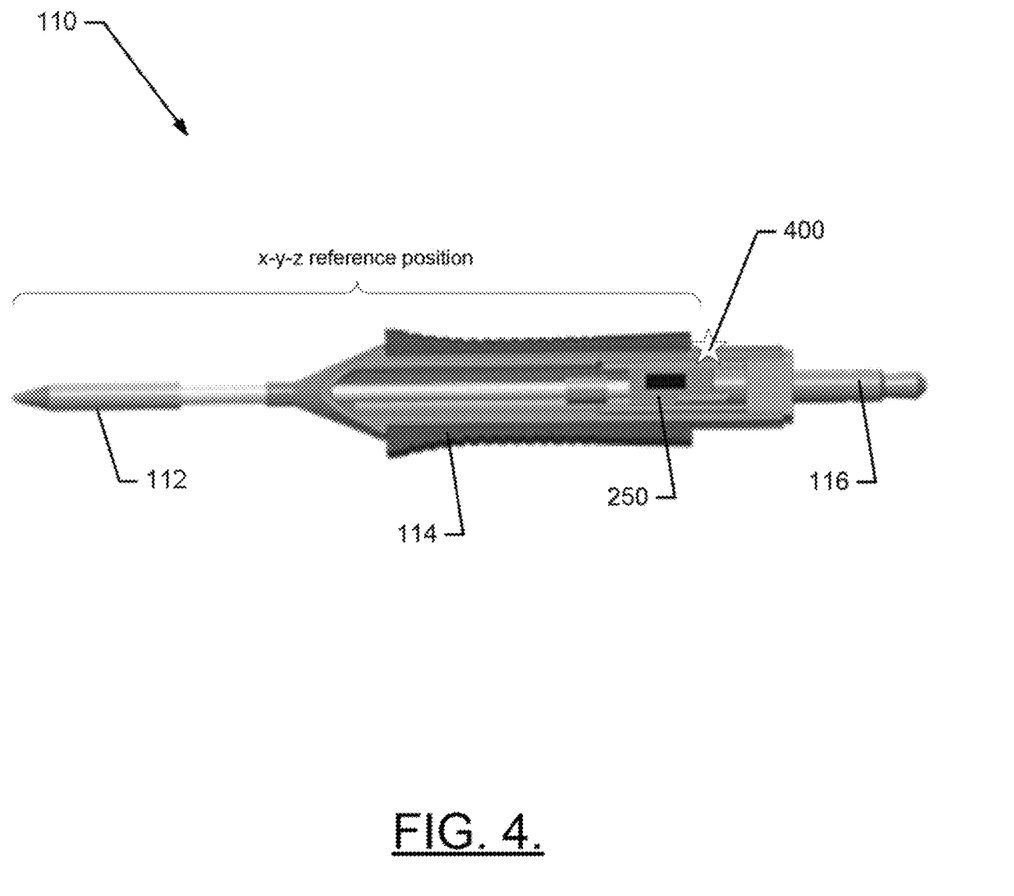
FIG. 4 illustrates a side view and partial cut-away view of the tip portion of a robotic system in accordance with an example embodiment.

One of the parameters that can be stored within the tip memory 250 may be a reference position of the distal end of the tip 112. In other words, the tip memory 250 may, for example, define an x-y-z reference position from any desirable reference point on the tip portion 110. As shown in FIG. 4, a reference position 400 may be defined for the tip portion 110. The reference position 400 may be a known position that is common to every instance of the tip portion 110 (i.e., regardless of a length or shape of the tip 112). The distal end of the tip 112 may then be measured from the reference position 400 and an x-y-z reference position for the distal end of the tip 112 may be stored in the tip memory 250. Thus, for example, if the tip portion 110 is inserted into the tool body 120 of a particular instance of the soldering tool 100, the specific location of the distal end of the tip 112 may be known. This knowledge may be useful, for example, for robotic systems in which the soldering tool 100 operates under the control of a robotic arm or other mechanical operator. The CPU 200 may be able to know the exact position (within a context defined using an x-y-z coordinate system) of the distal end of the tip 112 in order to reach joints under robotic control.

Thus, for any of a number of different parameters, the tip portion 110 can be interchangeable with different instances of the tool body 120 and/or the power unit 130, and the tip portion 110 may share information about itself (i.e., calibration data or reference position data) to enable the CPU 200 to improve operation of the soldering tool 100 based on specific knowledge about one or more parametric offsets or location information provided by the tip portion 110 (and stored locally at the tip portion 110). However, other useful information may also be stored at the tip portion 110 within the tip memory 250 to further enable unique operations of the soldering tool 100.

In this regard, for example, in addition to (or as an alternative to) storing parametric data (e.g., calibration data or reference position data) that is uniquely descriptive of an individual instance of the tip portion 110, unique identification information (e.g., a tip identifier) may be stored in the tip memory 250. The tip identifier for an individual instance of the tip portion 110 may allow parametric data stored at the tip memory 250 to be communicated to the tool body 120 and/or power unit 130, or to other devices so that the parametric data can be analyzed. As such, all of the parametric data extracted from the individual instance of the tip portion 110 can be associated with the tip identifier of the individual instance of the tip portion 110. The tip-identified data (i.e., parametric data that is associated with its respective tip identifier) may be analyzed to determine life cycle data or other data that may be used to determine whether the useful life of the tip portion 110 is ended, or whether maintenance should be undertaken.

In some examples, the tip identifier (or a code or other data) of the individual instance of the tip portion 110 may also or alternatively be used for performance of a security function. For example, the tool body 120 and/or power unit 130 may be programmed to interrogate the tip memory 250 of each tip portion inserted into the tool body 120. The interrogation may be useful to determine calibration data and/or reference position data as described above. Moreover, such data may also be provided in association with the tip identifier to enable analysis of the tip-identified data, as described above. However, the interrogation could also be an enablement criteria for allowing operation of the individual instance of the tip portion 110 with the tool body 120 and/or power unit 130. For example, if the tool body 120 and/or power unit 130 is interrogated and does not have a tip memory 250, no tip identifier may be provided in response to the interrogation. The tool body 120 and/or power unit 130 may, in response to a failed interrogation, not operate with the tip portion 110 and, in some cases, may issue an alarm, warning, or message to indicate the reason for non-operation. If the tool body 120 and/or power unit 130 are provided with a list of acceptable tip identifiers, the interrogation may (assuming the tip portion 110 has the tip memory 250) result in a return of the tip identifier from the tip portion 110 so that the tool body 120 and/or power unit 130 can compare the tip identifier received to the list of acceptable tip identifiers. If the tip identifier received is on the list of acceptable tip identifiers, operation of the tip portion 110 with the tool body 120 and/or power unit 130 may be allowed. However, if the tip identifier received is not on the list of acceptable tip identifiers, operation of the tip portion 110 with the tool body 120 and/or power unit 130 may be prevented. As noted above, an alarm, warning or message may also be issued to inform the operator of the reason for non-operation. Accordingly, operation of the soldering tool 100 with counterfeit tip portions may be prevented. As such, the tip identifier may act as a unique serial number for quality checked or approved equipment, and quality system operation can be enabled, and quality components can be traced.

Based on the descriptions above, it should be appreciated that example embodiments may provide a read/write enabled memory device (e.g., the tip memory 250) directly within the tip portion 110 of the soldering tool 100. However, the tip memory 250 is actually disposed in the handpiece 114 of the tip portion 110 so that the temperature at the tip memory 250 remains relatively constant due to the handpiece 114 remaining cool during operation of the soldering tool 100. This placement is likely to ensure fewer component failures and longer component life than any design that might, for example, place a memory chip within the tip 112 itself.

The tip memory 250 of an example embodiment may store calibration data for various parameters (including temperature) to enable better predictability and performance of the soldering tool 100. Moreover, by storing such calibration data in the tip portion 110, the tip portion 110 can be removed and installed in any different sets of tool body 120 and power unit 130 and still enable calibrated operation with the CPU 200, which is located in the power unit 130. Example embodiments also use a "one wire" communication protocol in which the tip memory 250 uses a single wire to communicate with the CPU. Moreover, the communication between components is hard wired (via plugging the plug pin 116 into the plug connector 122 to form a communication jack or socket) in example embodiments instead of providing wireless communication, which can be error prone. In addition, wireless communication requires additional wireless communication circuitry in both the sending component and receiving component. By placing the CPU 200 in the power unit 130, and providing wired communication means from the power unit 130 to the tip portion 110, smart communication between the CPU 200 and the tip memory 250 can be achieved with fewer communication errors and with a simpler and cheaper design for the tip portion 110.

Example embodiments may provide precise control of tip temperatures across many different types (e.g., shapes and sizes) of tip portions (e.g., by using the sensor 220 and T-Offset). Other parameters, reference position data and life cycle data (such as predictive maintenance-related data) can also be locally stored in connection with the tip portion 110. The local storage can also be used to store security information (e.g., tip identifiers or other codes) that can be used to prevent use of counterfeit tip portions. The tip identifiers may also provide unique identification numbers that can be used for total process traceability. Calibration and customer initiated recalibration can each also be enabled by example embodiments.

Thus, according to an example embodiment, a soldering tool may be provided. The soldering tool may include a tool body comprising circuitry configured to interface with a controller, and a tip portion including a tip that is heated to melt solder and a handpiece that is graspable by an operator. The tip portion includes a heater and a sensor disposed in the tip. The tip portion includes a tip memory device disposed at the handpiece. The tip memory device is configured to store parametric data (e.g., parametric properties, specific properties, maintenance/history/usage data, etc.) gathered by the sensor. The tip memory device is configured to exchange data (including the parametric data) with the controller.

In some cases, the tool described above may be augmented or modified by altering individual features mentioned above or adding optional features. The augmentations or modifications may be performed in any combination and in any order. For example, in some cases, the parametric data may include temperature offset data indicating a temperature difference between a sensed temperature at the sensor and a temperature at a distal end of the tip. In an example embodiment, the tip memory device may be configured to communicate the parametric data to the controller to enable the controller to operate the heater based on the parametric data. In some cases, the parametric data stored at the tip memory device may be updateable. In an example embodiment, the controller may be disposed at a power unit operably coupled to the tool body via a cable. In some cases, the cable may include a ground wire and a power line each of which are interruptible via removal of a plug pin disposed at the tip portion from a plug connector disposed at the tool body. In an example embodiment, the circuitry may include a converter configured to transition from a two wire communication operably coupling the circuitry to the controller to a one wire communication operably coupling the circuitry to the tip memory and the sensor. In some cases, the tip memory device may be further configured to store a tip identifier associated with an identity of the tip portion. In an example embodiment, the tip identifier may be communicated to the controller and the controller is configured to enable operation of the tip portion based on the tip identifier. In some cases, the parametric data may be stored in association with the tip identifier as tip-identified data, and the tip-identified data may define life cycle data associated with the tip portion for determining maintenance to be performed on the tip portion. In an example embodiment, the tip memory device may store information indicative of a location of a distal end of the tip portion relative to a reference point disposed at a portion of the handpiece.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tip portion for a soldering tool, the tip portion comprising:
    a handpiece configured to be graspable by an operator;
    a tip extending from a forward end of the handpiece, wherein the tip comprises a heater and a sensor;
    electronic components comprising a connection wire and a tip memory device configured to communicate parametric data to control a temperature of the tip;
    a plug pin disposed on an opposite side of the handpiece relative to the tip, the plug pin comprising a first electrical connection for power, a second electrical connection for ground, and a third electrical connection for communicating data;
    wherein the connection wire connects the sensor to the third electrical connection of the plug pin.

2. The tip portion of claim 1 wherein the tip, the handpiece, and plug pin are disposed on a common lateral axis.

3. The tip portion of claim 1 wherein the handpiece comprises an insulated grip disposed on an external surface of the handpiece.

4. The tip portion of claim 1, wherein the tip memory device is configured to communicate the parametric data to a controller of a soldering tool to enable the controller to operate the heater based on the parametric data.

5. The tip portion of claim 4, wherein the tip memory device is configured to communicate the parametric data to the controller via the connection wire and the third electrical connection of the plug pin.

6. The tip portion of claim 1, wherein the tip memory device is further configured to store and communicate a tip identifier associated with an identity of the tip portion.

7. The tip portion of claim 1, wherein the parametric data comprises temperature offset data indicating a temperature difference between a sensed temperature at the sensor and a temperature at a distal end of the tip.

8. A tip portion for a soldering tool, the tip portion comprising:
    a handpiece that is configured to be graspable by an operator;
    a tip comprising a heater and a sensor;
    a plug pin disposed on an opposite side of the handpiece relative to the tip, the plug pin configured to electrically connect the tip portion to a soldering tool; and
    a tip memory device configured to store parametric data and communicate the parametric data to control a temperature of the tip;
    wherein a connection wire of the tip portion, as a single wire interface, connects the sensor to the plug pin, with the tip memory device also being connected to the connection wire;
    wherein the heater is connected to the plug pin to power the heater.

9. The tip portion of claim 8 wherein the tip, the handpiece, and plug pin are disposed on a common lateral axis.

10. The tip portion of claim 8 wherein the handpiece comprises an insulated grip disposed on an external surface of the handpiece.

11. The tip portion of claim 8, wherein the tip memory device is configured to communicate the parametric data to a controller of a soldering tool to enable the controller to operate the heater based on the parametric data.

12. The tip portion of claim 8, wherein the tip memory device is further configured to store and communicate a tip identifier associated with an identity of the tip portion.

13. The tip portion of claim 8, wherein the parametric data comprises temperature offset data indicating a temperature difference between a sensed temperature at the sensor and a temperature at a distal end of the tip.

* * * * *